(12) United States Patent
Bronowich

(10) Patent No.: US 10,405,183 B2
(45) Date of Patent: Sep. 3, 2019

(54) PURPOSED DEVICE SYSTEM AND METHOD FOR SMARTPHONE

(71) Applicant: Joe Bronowich, New York, NY (US)

(72) Inventor: Joe Bronowich, New York, NY (US)

(*) Notice: Subject to any disclaimer, the term of this patent is extended or adjusted under 35 U.S.C. 154(b) by 0 days.

(21) Appl. No.: 15/231,043

(22) Filed: Aug. 8, 2016

(65) Prior Publication Data

US 2016/0345178 A1 Nov. 24, 2016

Related U.S. Application Data

(63) Continuation-in-part of application No. 15/080,840, filed on Mar. 25, 2016, now abandoned.

(60) Provisional application No. 62/138,285, filed on Mar. 25, 2015.

(51) Int. Cl.
*H04W 12/08* (2009.01)

(52) U.S. Cl.
CPC .................. *H04W 12/08* (2013.01)

(58) Field of Classification Search
CPC .................................... H04W 12/08
USPC ............................................. 726/3
See application file for complete search history.

(56) References Cited

U.S. PATENT DOCUMENTS

| | | | |
|---|---|---|---|
| 9,600,327 B2* | 3/2017 | Rangaraju | |
| 2010/0203896 A1* | 8/2010 | Noguchi | H04W 28/16 455/450 |
| 2014/0282853 A1* | 9/2014 | Velammal | G06F 21/54 726/1 |
| 2015/0222656 A1* | 8/2015 | Haugsnes | H04L 63/1441 726/23 |

* cited by examiner

*Primary Examiner* — Kambiz Zand
*Assistant Examiner* — Aubrey H Wyszynski
(74) *Attorney, Agent, or Firm* — Pryor Cashman LLP

(57) ABSTRACT

Methods and systems for restricting purposes of a smart device are disclosed. The methods and systems include the smart device having a plurality of applications and preexisting settings, comprising the steps of by an administrator, choosing settings that specify which of the plurality of applications on the smart device will remain on the smart device and which of the plurality of applications will be restricted on the smart device, by a portal, creating a configuration envelop based on the settings, by a client, checking into the portal and exchanging the envelop with the preexisting settings of the smart device, reading the settings on the smart device, using a combination of functions and application program interfaces to enact the restriction, and checking into the portal to confirm successful restriction.

10 Claims, 3 Drawing Sheets

PURPOSED DEVICE SYSTEM AND METHOD FOR SMARTPHONE

RELATED APPLICATIONS

This application claims priority to U.S. Provisional Patent Application No. 62/138,285, filed Mar. 25, 2015, and Non-provisional patent application Ser. No. 15/080,840, filed Mar. 25, 2016, the disclosures and teachings of which are incorporated herein by reference.

FIELD OF THE INVENTION

The present invention is directed to systems and methods that can be used to turn a full featured "smart" phone, such as an Android device, into a purposed device with an interface that presents only a subset of applications, programs and/or and purposes and that restricts access to a large number of other applications and technologies that may still be resident on the device.

BACKGROUND OF THE INVENTION

The explosion of "smart device" technology is well documented, with the focus for each release of each operating system being more functionality and greater capability for the end user. Since these developments have been driven by what has been named "the consumer-ization of technology," the approach of nearly all carriers, devices, operating systems and application vendors has been to add more features and functionality to smart phones to be competitive.

However, this ignores the very real need for devices that are "purposed" for a specific function or set of functions. There are many use cases where devices are better utilized if users have no access to many of the items that are desirable to normal consumers and are installed on stock devices. These items can include both operating system settings as well as third party applications, which may be "bundled" with the device at the firmware level, for example, Frequently, distributors of devices need to restrict the use of those devices based on the needs of the end user of the device so that it can better support the business objectives of the project. Examples of such situations include, but are not limited to 1) carriers wishing to sell a device at a different and often lower price point who need to restrict use and network consumption to justify that price point, 2) commercial organizations that wish to distribute devices and ensure that they are used primarily for the distributed purpose, such as ordering or communicating to restricted individuals, 3) organizations that need to restrict a device's use to a subset of purposes, such as medical organizations that have to provide only HIPAA compliant applications while restricting non-compliant ones, service organizations who wish end user devices be limited to specific applications to preserve expenses and productivity, or others, 4) organizations and network providers that wish to ensure that the connectivity to technologies such as Wi-Fi and others are controlled and prioritized in order to restrict connectivity to desired access methods and locations, and 5) carriers that wish to automatically increase a purposed device's functionality over the air in order to add additional functionality and charge a higher price point. Removal of the undesired features is extremely difficult or impossible, even for the carriers that sell the devices to enterprise customers. Currently, technology provides restricted devices that are able to run only one application at a time as a simplistic solution to this problem. For example, in place of check out registers many stores use tablets which run only a payment application. These restricted devices cannot access any other functions though and no longer function as a smartphone, tablet, or other device. The present invention, however allows multiple applications to exist, and even run, on a device but limits each of the applications, settings, or other options to only allow the desired features so that the device can still have multiple functions while being appropriately limited. The present invention is a novel solution that allows this to be easily accomplished, and also be dynamically controlled.

The present invention utilizes unique technology and skill sets in concert with technologies from the operating system manufacturers, Original Equipment Manufacturers (OEMs), Carriers, and Application Vendors.

SUMMARY OF THE INVENTION

It is an object of the present invention to provide a method for restricting purposes of a smart device, the smart device having a plurality of applications and preexisting settings, comprising the steps of by an administrator, choosing settings that specify which of the plurality of applications on the smart device will remain on the smart device and which of the plurality of applications will be restricted on the smart device, by a portal, creating a configuration envelop based on the settings, by a client, checking into the portal and exchanging the envelop with the preexisting settings of the smart device, reading the settings on the smart device, using a combination of functions and application program interfaces to enact the restriction, and checking into the portal to confirm successful restriction.

DETAILED DESCRIPTION

Figure 1:
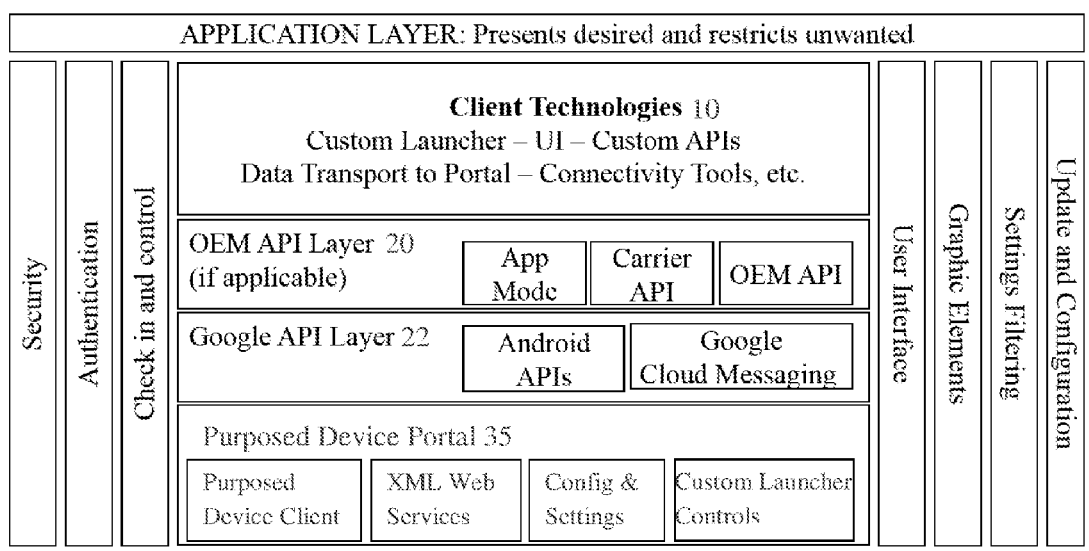
FIG. 1 shows an exemplary architecture of the deployment of the present invention on an Android smartphone.

The basic method provides a mechanism for restricting a smartphone's functions to prohibit access to unwanted applications, settings, and technologies to create a purposed device 30. The purposed device 30 may be a device that can only be used for push-to-talk communication, a device that is unable to browse the internet, or a device that can only be used to order products from a specific buyer, among many other possibilities.

The present invention allows a purposed device's interface to be controlled by a server 40 that filters through the technology available on the device and allows access only to the desired functions. Thus, the user is only able to use the approved functions. The server 40 can also update and change the allowed functions as desired.

The present invention allows a customer to choose application(s) that will reside in the interface and those that will be restricted (Step 100) and then configures technologies on a stock device 50 to present access to unwanted functions (Step 200) by installing invented software on the device (Step 300) and searching for loopholes or alternative pathways that would allow a user to reach the unwanted functions. The invention monitors these technologies using the application program interfaces 22 from the operating system manufacturer (such as Google), the device manufacturer or original equipment manufacturer (OEM) 20, such as Samsung Safe for Samsung devices, the carrier the device connects to (local or network based APIs or data), or from the manufacturer of the applications. When the invention finds loopholes or pathways to the functions, it disables or closes them, preventing a user from reaching the unwanted function through any application or setting.

The loopholes or pathways are disabled or closed according to a series of steps. First, a portal creates an encrypted configuration XML envelope had on settings set by the administrator. Then the client securely checks into the portal and exchanges the encrypted envelope with the settings therein. The client on the device reads the settings locally and uses a combination of functions and APIs to enact the configuration, push applications and apply any restrictions as set by administrator. These functions include, but are not limited to, operating system or android native functions and libraries, OEM provided functions and libraries, carrier image provided functions and libraries, proprietary provided functions and libraries, either resident in the client, placed there by the OEM or carrier, or pushed by above mentioned processes. Once this is completed, the client checks back in with the portal to report and confirms success (Steps 400 through 600). The client regularly checks back in with the portal to process any changes or updates.

The present invention can access the technologies whether they are restricted or utilized. Thus, the invention is to restrict access to undesired functions even if they exist in the normal operating system or third party applications which are resident or may be used as part of the platform but have an undesired feature within. It can also use its own custom API's and other tools to further customize the altered device.

For example, one embodiment of the invention is a purposed device that limits a smartphone to only making phone calls. In this example, the invention might provide an interface that reflects the limitation by restricting a user's options to only the phone call application and a contacts list. This can be accomplished using a carrier's API restrict and lock capabilities or by another method. In addition, the present invention will monitor the allowed applications for alternative pathways around the restrictions and close those pathways accordingly. In this example, the invention might monitor the phone call application to discover and disable prohibited uses such as internet calls, video calls, and text messaging. Because the invention remains customizable by the server, if an owner would like to add a new feature at a later time, such as, for example, the ability to make internet calls only to 911 or a local police station, that customization is possible and easily accomplished.

FIG. 1 shows an example architecture of the deployment on an Android smartphone. The Figure shows the present invention's client technologies 10 interacting with multiple layers 20 and 22, reaching the application layer after monitoring and limiting functions on the operating system 22 (Google) and the OEM 20 levels, and possibly adding further custom client technologies, to finally present only the desired applications 30.

Figure 2:
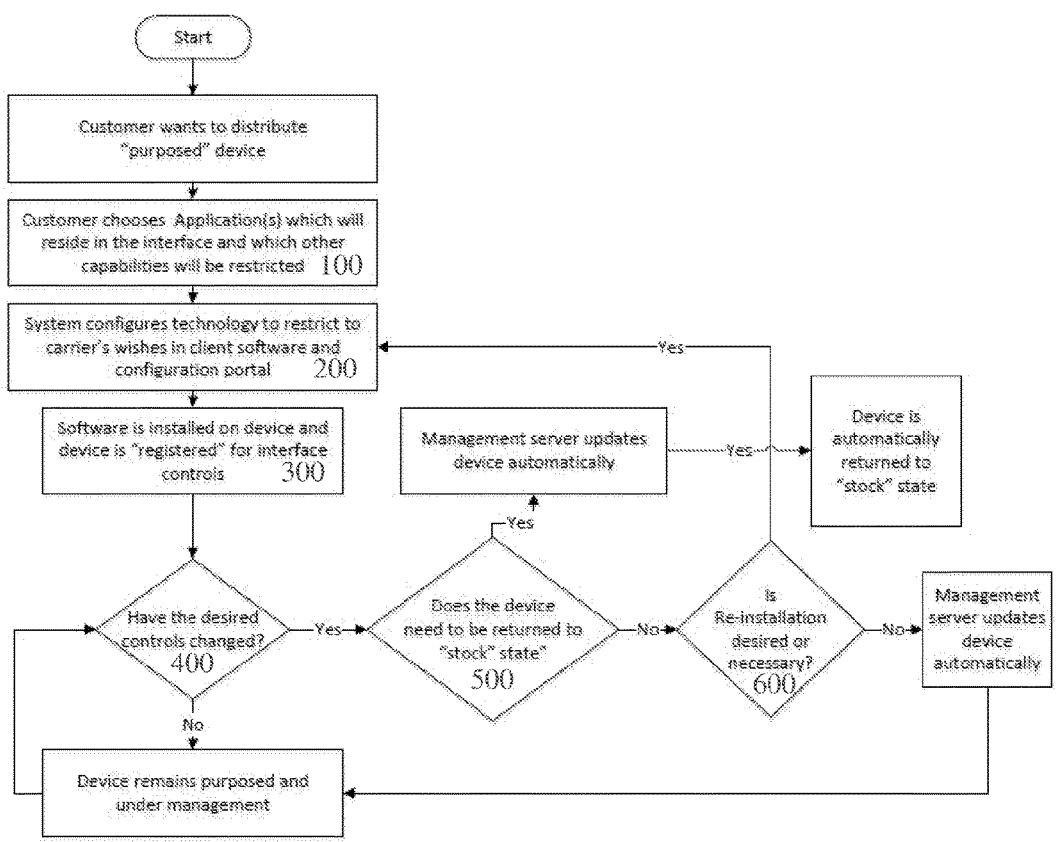
FIG. 2 shows the logic flow of the execution of a purposed smartphone device.

The purposes and objectives of an organization wishing to present a "purposed" device can be varied, as described above. A logic flow of the execution of those purposes is shown FIG. 2.

Figure 3:
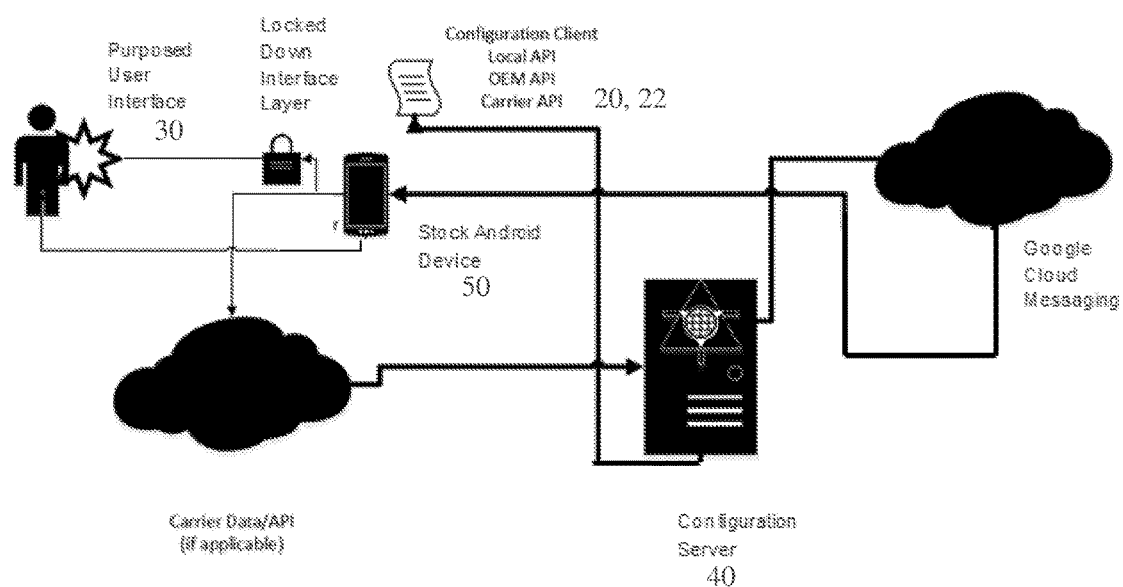
FIG. 3 illustrates the interaction of key components of the present invention.

Key components of the platform are ways the devices can use their native states to communicate but access to those communications methods and the configurations they execute are controlled by the administrators of the system. This feature is illustrated in FIG. 3.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

The invention claimed is:

1. A method for restricting purposes of a smart device, the smart device having a plurality of applications and preexisting settings, comprising the steps of:
by an administrator, choosing settings that specify which of the plurality of applications on the smart device will remain on the smart device and which of the plurality of applications will be restricted on the smart device;
by a portal, creating a configuration envelop based on the settings;
by a client, checking into the portal and exchanging the envelop with the preexisting settings of the smart device;
reading the settings on the smart device;
using a combination of functions and application program interfaces to enact the restriction; and
checking into the portal to confirm successful restriction; and
monitoring the plurality of applications on the smart device remaining on the smart device for one or more alternative pathways around the restriction and disabling the one or more alternative pathways.

2. The method of claim 1, wherein the restriction restricts the smart device such that the smart device is only capable of push-to-talk communication.

3. The method of claim 1, wherein the restriction restricts the smart device such that the smart device is not capable of browsing the internet.

4. The method of claim 1, wherein the restriction restricts the smart device such that the smart device is only capable of placing orders with a specific party.

5. The method of claim 1, wherein the restriction restricts the smart device such that the smart device is only capable of telephonic communication.

6. A method for restricting purposes of a smart device, the smart device having a plurality of applications and preexisting settings, comprising the steps of:
by an administrator, choosing settings that specify which of the plurality of applications on the smart device will remain on the smart device and which of the plurality of applications will be restricted on the smart device;
by a portal, creating a configuration envelop based on the settings;
by a client, checking into the portal and exchanging the envelop with the preexisting settings of the smart device;
reading the settings on the smart device;
using a combination of functions and application program interfaces to enact the restriction; and
checking into the portal to confirm successful restriction;
wherein an interface of the smart device is controlled by a server that permits the smart device to access one or more functions associated with the smart device.

7. The method of claim 6, wherein the server is capable of updating or changing the one or more functions that may be accessed by the smart device.

8. The method of claim 7, further comprising monitoring the plurality of applications on the smart device remaining on the smart device for one or more alternative pathways around the restriction and disabling the one or more alternative pathways.

9. The method of claim 8, wherein the plurality of applications on the smart device remaining on the smart device includes a telephonic communication application, and wherein the telephonic communication application is monitored and one or more of an internet communication application, a video communication application, and a text messaging application is disabled.

10. The method of claim 9, wherein the server is capable of permitting one or more of the internet communication application, the video communication application, and the text messaging application to be enabled for use in contacting emergency or rescue service agencies.

* * * * *